(12) United States Patent
Moilanen et al.

(10) Patent No.: US 7,669,204 B2
(45) Date of Patent: Feb. 23, 2010

(54) AUTONOMIC SMT SYSTEM TUNING

(75) Inventors: Jacob Lorien Moilanen, Austin, TX (US); Joel Howard Schopp, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1229 days.

(21) Appl. No.: 10/965,152

(22) Filed: Oct. 14, 2004

(65) Prior Publication Data

US 2006/0085368 A1   Apr. 20, 2006

(51) Int. Cl.
*G06F 9/46* (2006.01)
*G06F 15/76* (2006.01)

(52) U.S. Cl. .................. 718/102; 718/103; 718/104; 718/107; 712/43

(58) Field of Classification Search ........... 718/102, 718/107, 103, 104; 712/43
See application file for complete search history.

(56) References Cited

U.S. PATENT DOCUMENTS

| | | | | |
|---|---|---|---|---|
| 5,012,409 | A * | 4/1991 | Fletcher et al. | 718/103 |
| 7,152,170 | B2 * | 12/2006 | Park | 713/320 |
| 2003/0033509 | A1 * | 2/2003 | Leibholz et al. | 712/228 |
| 2003/0135711 | A1 * | 7/2003 | Shoemaker et al. | 712/200 |
| 2008/0177682 | A1 * | 7/2008 | Moilanen et al. | 706/13 |

OTHER PUBLICATIONS

Nakajima et al., "Enhancements for Hyper-Threading Technology in the Operating System—Seeking the Optimal Scheduling", Dec. 8, 2002, Proceedings of the 2nd Workshop on Industrial Experiences with Systems Software, USENIX Association, pp. 1-15.*
Celebioglu et al., "The Performance Impact of Computational Efficiency on HPC Clusters with Hyper-Threading Technology", Proceedings of the 18th International Parallel and Distributed Processing Symposium, IEEE, Apr. 26-30, 2004, pp. 250-255.*

* cited by examiner

*Primary Examiner*—Thomas Lee
*Assistant Examiner*—Kenneth Tang
(74) *Attorney, Agent, or Firm*—Schubert Osterrieder & Nickelson PLLC; Matthew W. Baca

(57) ABSTRACT

Methods, systems, and media are disclosed for autonomic system tuning of simultaneous multithreading ("SMT"). In one embodiment, the method for autonomic tuning of at least one SMT setting for an optimized processing, such as via throughput, latency, and power consumption, of a workload on a computer system includes calling, by a kernel, an SMT scheduler having at least one hook into a genetic library. Further, the method includes obtaining, by the SMT scheduler through the at least one hook, genetic data from the genetic library for the optimized processing of the workload. Further still, the method includes tuning, by the SMT scheduler and based on the obtaining, the at least one SMT setting for at least one cpu of the computer system.

12 Claims, 3 Drawing Sheets

| Genetic Algorithm Outline |
|---|
| 1. Generate initial population, *i.e.*, create children, wherein each child is a time-slice having a particular setting for turning or tweaking particular cpus and/or threads on or off in the system. |
| 2. Run population time-slices. |
| 3. Calculate performance and rank children, and retain top half of performers. |
| 4. Retained top half of performers determined from step 3 become the parents from which the new children are then created to form the new population in each successive generation; optionally and further introduce mutations in each successive generation before running step 2 and 3 again for the newly created population. |
| 5. Repeat 4 continuously or for a fixed period, such as number of generations, time, or threshold performance. |

FIG 2

AUTONOMIC SMT SYSTEM TUNING

FIELD OF INVENTION

The invention generally relates to autonomic system tuning of simultaneous multi-threading ("SMT"). More particularly, the invention relates to methods, systems, and media for autonomic system tuning of SMT by employing a genetic algorithm to determine whether to turn SMT on or off depending on the particular workload, whereby turning on SMT only enhances processor performance.

BACKGROUND

Many programming languages, operating systems, and other software development environments support "threads of execution," or, as more commonly called, "threads." Threads are similar to processes, which are tasks that take turns running on the central processing unit (cpu) of a computer. Threads are similar in that both represent a single sequence of instructions executed in parallel with other sequences, either by time-slicing or multiprocessing. Threading, itself, however, is a technology that, when present, enables the splitting of a program's tasks into two or more simultaneously running processes, and thereby, generally accelerates processing by the cpu.

Looking first at conventional time-slicing, also known as multitasking, this occurs when multiple processes share common processing resources, such as the cpu. At any point in time, only one of these tasks is running, i.e., the cpu is actively executing instructions for the process. The operating system may choose at any given moment to elect another process for running.

Now looking at multiprocessing, this is the use of multiple concurrent processes in a system as opposed to a single process at any one instant. Like multitasking, which allows multiple processes to share a single cpu, multiple cpus may be used to execute threads within a single process. Multitasking for general tasks is often fairly difficult because various programs holding internal data, known as state. Essentially the programs are typically written in such a fashion that they assume their data is incorruptible. However, if another copy of the program is running on another processor, the two copies can interfere with each other by both attempting to read and write their state at the same time. A variety of programming techniques are used to avoid this problem, including semaphores and other checks and blocks which allow only one copy of the program to change such values at a time. Another problem is that processors often use a speed-increasing technique known as caching in which small pools of very fast memory are associated with each processor in order to allow them to work with temporary values very quickly. This can lead to a situation in which each processor is working in a separate cache, rather than in the shared memory; changes to a processor's local cache will not be communicated to other processors until the contents of the cache are written to shared memory. This cannot be helped via programming techniques because it is invisible to the programs themselves. In this case the problem requires additional hardware in order to make sure that all caches on the various processors are up to date, and synchronized with one another.

With the introduction of virtual memory it became useful to distinguish between multitasking of processes and threads. Tasks which share the same virtual memory space are called threads. Threads are described as lightweight because switching between threads does not involve changing the virtual memory context. Processes were distinguished by the fact that each had its own virtual memory space, so that it appeared to have the entire memory to itself, and could contain multiple threads running in that memory. Operating system functions are typically mapped into each virtual address space and interrupt handling typically runs in whichever memory context is in place when the interrupt occurs, so programs are still vulnerable to malfunctioning system code.

A common use of threads is having one thread paying attention to the graphical user interface while others do a long calculation in the background. As a result, the application more readily responds to user's interaction. An advantage of a multi-threaded program is that it can operate faster on computer systems that have multiple cpus, or across a cluster of machines.

Operating systems generally implement threads in either of two ways: preemptive multithreading or cooperative multithreading. Preemptive multithreading is generally considered the superior implementation, as it allows the operating system to determine when a context switch should occur. Cooperative multithreading, on the other hand, relies on the threads themselves to relinquish control once they are at a stopping point. This can create problems if a thread is waiting for a resource to become available. The disadvantage to preemptive multithreading is that the system may make a context switch at an inappropriate time, causing priority inversion or other bad effects which may be avoided by cooperative multithreading.

Hardware support for software threads is provided by simultaneous multithreading (SMT). SMT technology enables multi-threaded software applications to execute threads in parallel. This level of threading technology has never been seen before in a general-purpose microprocessor. Internet, e-business, and enterprise software applications continue to put higher demands on processors. To improve performance in the past, threading was enabled in the software by splitting instructions into multiple streams so that multiple processors could act upon them. Today with SMT technology, processor-level threading can be utilized which offers more efficient use of processor resources for greater parallelism and improved performance on today's multi-threaded software.

SMT technology provides thread-level-parallelism (TLP) on each processor resulting in increased utilization of processor execution resources. As a result, resource utilization yields higher processing throughput, minimized latency, and minimized power consumption. SMT technology know also permits multiple threads of software applications to run simultaneously on one processor. This is achieved by duplicating the architectural state on each processor, while sharing one set of processor execution resources. SMT technology also delivers faster response times for multi-tasking workload environments. By allowing the processor to use on-die resources that would otherwise have been idle, SMT technology provides a performance boost on multi-threading and multi-tasking operations.

This technology is largely invisible to the platform. In fact, many applications are already multi-threaded and will normally and automatically benefit from this technology. However, multi-threaded applications take full advantage of the increased performance that SMT technology has to offer, allowing users will see immediate performance gains when multitasking. Today's multi-processing aware software is also compatible with SMT technology enabled platforms, but further performance gains can be realized by specifically tuning software for SMT technology. This technology complements traditional multi-processing by providing additional headroom for future software optimizations and business growth.

Despite advantages often obtained in processor performance through SMT, problems remain. Recent state of the art reports indicate that always enabling SMT is not always beneficial. In fact, performance of some applications with SMT enabled results in detrimental effects; performance is known to drop by as much as half. What is needed, therefore, are methods, systems, and media for determining beneficial enablement of SMT for various workloads, and to do so autonomically in an effort to remove reliance on a system administrator.

SUMMARY OF THE INVENTION

Embodiments of the invention generally provide methods, systems, and media for autonomic system tuning of SMT. In one embodiment, the method for autonomic tuning of at least one SMT setting for optimized processing of a workload on a computer system includes calling, by a kernel, an SMT scheduler having at least one hook into a genetic library. Further, the method includes obtaining, by the SMT scheduler through the at least one hook, genetic data from the genetic library for the optimized processing of the workload. Depending on the performance metric at issue, the optimized processing is realized through increased throughput, minimized latency, minimized power consumption, or another metric that the user seeks to optimize for a workload through autonomic tuning of SMT. The method also includes tuning, by the SMT scheduler and based on the obtaining, the at least one SMT setting for at least one cpu of the computer system.

In another embodiment, the invention provides a system for autonomic tuning of at least one SMT setting for optimized processing of a workload on a computer system. The system generally includes a kernel in communication with an SMT scheduler having at least one hook into a genetic library. Further, the system includes a genetic data module of the genetic library, wherein the genetic data module has genetic data necessary for the optimized processing of the workload. The genetic data relates to optimization of SMT enablement as it relates to metrics such as throughput, latency, power consumption, and so forth. Further still, the system includes a control module of the genetic library for providing the genetic data to the SMT scheduler through the at least one hook, whereby the SMT scheduler tunes the at least one SMT setting for at least one cpu of the computer system in accordance with genetic data provided.

In yet another embodiment, the invention provides a machine-accessible medium containing instructions for autonomic tuning of at least one SMT setting for optimized processing of a workload on a computer system, which when executed by a machine, cause the machine to perform operations. The instructions generally include operations for calling, by a kernel, an SMT scheduler having at least one hook into a genetic library. The instructions further include operations for obtaining, by the SMT scheduler through the at least one hook, genetic data from the genetic library for the optimized processing of the workload. Depending on the performance metric at issue, the optimized processing is realized through increased throughput, minimized latency, minimized power consumption, or another metric that the user seeks to optimize for a workload through autonomic tuning of SMT. Further still, the instructions include operations for tuning, by the SMT scheduler and based on the obtaining, the at least one SMT setting for at least one cpu of the computer system.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIG. 2 depicts an outline of the genetic algorithm in accordance with the disclosed invention.

DETAILED DESCRIPTION OF THE EMBODIMENTS

Figure 1:
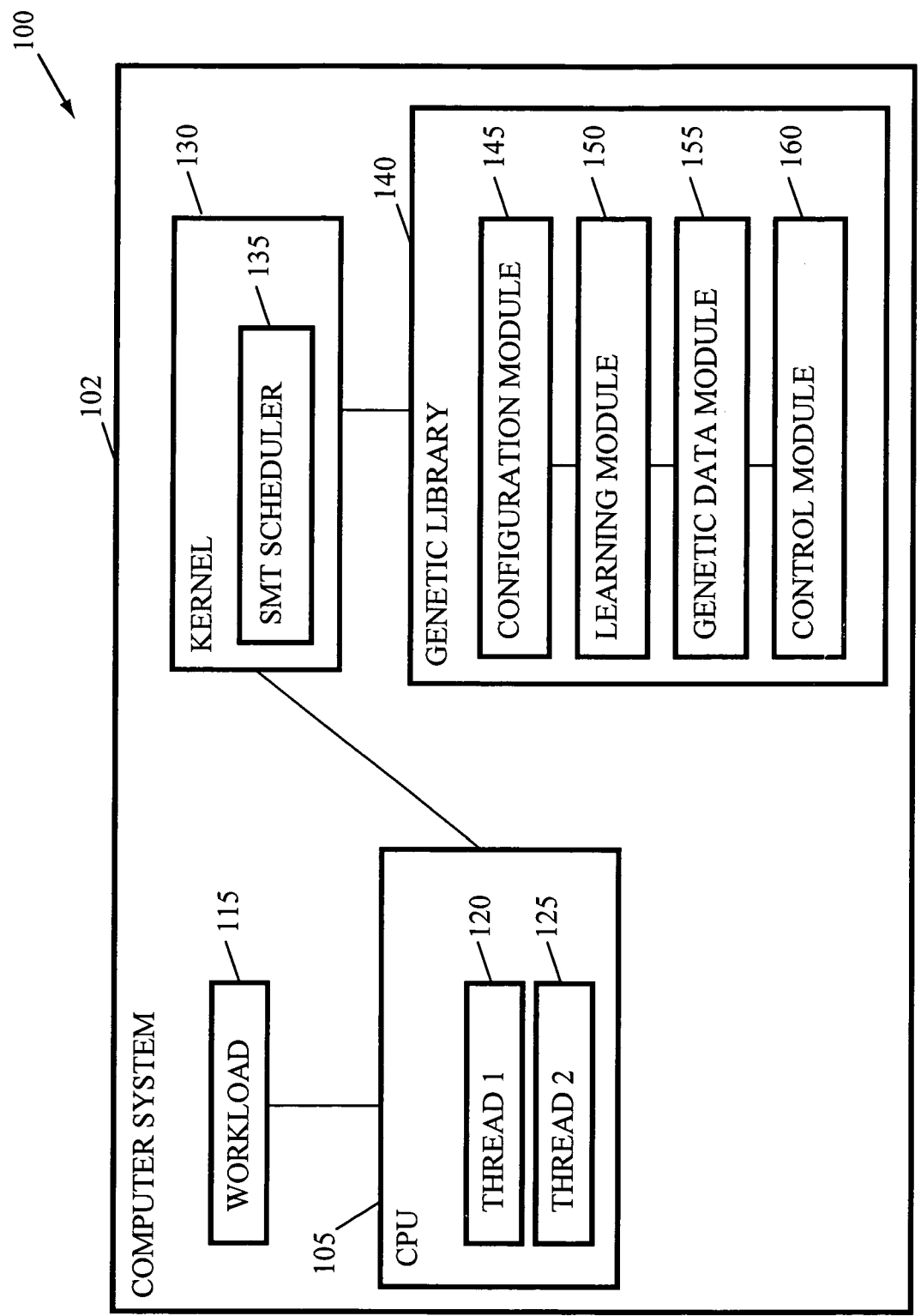
FIG. 1 depicts an example embodiment of a system for autonomic system tuning of SMT for a workload in accordance with the disclosed invention.

The following is a detailed description of example embodiments of the invention, a description further enhanced by the accompanying drawings. The embodiments are examples and are in such detail as to clearly communicate the invention. However, the amount of detail offered is not intended to limit the anticipated variations of embodiments; on the contrary, the intention is to cover all modifications, equivalents, and alternatives falling within the spirit and scope of the present invention as defined by the appended claims. The detailed descriptions below are designed to make such embodiments obvious to a person of ordinary skill in the art.

Generally speaking, systems, methods, and media for autonomic system tuning of simultaneous multithreading ("SMT") are contemplated. Before discussing details of the invention, however, a discussion of the problem and invention's purpose ensues. After this preliminary discussion, details of the invention follow.

Many modern central processing units ("cpus"), or simply processors, have the ability to run more than one thread simultaneously. The concept is that overall system throughput, latency, power consumption, and other metrics can be optimized for a workload because of efficient utilization of the cpu. Although this disclosure generally discusses the invention's application to increased throughput of a workload on a computer system, it is understood that the invention also and equally applies to beneficial SMT enablement for optimized processing of a workload for other metrics such as minimized latency and power consumption. As stated in the background of this disclosure, however, recent state of the art reports have shown that enablement of SMT is actually detrimental at times. The goal of the disclosed invention is to autonomically enable SMT settings for threaded processing on cpus only when such is beneficial.

Generally, enabling SMT benefits faster processing by the cpu because SMT tries to use different threads of the cpu that are not in use, but could be used to process different processes of a particular workload on the computer system; this is, SMT facilitates multitasking. For instance, SMT may simultaneously use one thread to do a floating point calculation, and another thread to do an integer calculation. By SMT enabling this parallel processing by different threads, quicker processing of the floating point and integer calculations results as compared to serial processing of the same calculations. Sometimes, however, enabling SMT slows down processor performance, and this invention provides a solution to remedy this slow down.

One reason enabling SMT sometimes slows down processor performance is limited cache. For example, suppose two threads share the same, limited cache. If one of these two threads is using all cache, then the other thread running on the cpu needs to retrieve its instructions and data from memory, which tremendously slows down the second thread's processing as compared to being able to otherwise retrieve the same instructions and data from the unavailable cache. In this instance, enabling SMT hinders processor performance.

Another reason enabling SMT sometimes slows down processor performance is monopolization of a certain cpu component by one of two threads. For instance, suppose two very similar threads need to do floating point calculations. Here, two of the same threads on the cpu are attempting to use the same cpu component when only one of the threads can use the cpu component at one time. As a result, enabling SMT provides no processing enhancement, and, in fact, the same, detrimental cache issue just explained occurs. This is another instance of when SMT hinders processor performance.

To determine when enabling SMT is only beneficial, and to do so autonomically, is the objective of the invention. To achieve this end, generally speaking, methods, systems, and media employ a genetic algorithm for autonomic system tuning of SMT for a particular workload on a computer system. The genetic algorithm is called such because its underlying functionality is similar to the natural selection theory. More particularly, the kernel of the operating system for a computer system calls the SMT scheduler, which schedules whether to enable SMT. Before determining whether to enable SMT for a particular workload on the system, however, the SMT scheduler uses its one or more autonomic hooks to tie into a genetic library, which may be a plug-in into the kernel. Within the genetic library performance and ranking data (i.e., genetic data) either already exists or is calculated for the particular workload; either way, the genetic data was or is calculated by the genetic algorithm in the genetic library. Through iterations of the genetic algorithm essentially varying enablement of SMT settings on or off for the various cpus on the computer system, genetic data is calculated and re-calculated for a particular metric, such as throughput, latency, or power consumption, in order to achieve optimal processing in terms of SMT enablement for a particular workload. The SMT scheduler then retrieves the genetic data for the particular workload, wherein this genetic data is received through at least one hook to the SMT scheduler, and instructs the SMT scheduler on the exact SMT settings for the cpus handing the particular workload. As a result, based on this genetic data, SMT is autonomically enabled for the particular workload only if SMT benefits its processing.

Turning now to FIG. 1, a system 100 for autonomic system tuning of SMT, in accordance with the invention, is depicted. The system 100 includes a computer system 102 with a cpu 105 and a particular workload 115 to undergo processing optionally using thread-1 120 and thread-2 125 with SMT either enabled or not as directed by the SMT scheduler 135. For purposes of this discussion, only one cpu 105 and two threads 120, 125 are depicted, but it is understood that more than one cpu and/or more than two threads may be used for a computer system to autonomically process different and varying workloads on a computer system such as computer system 102 with SMT optionally enabled as directed by the SMT scheduler 135.

The cpu 105 is in communication with the kernel 130 of the operating system for the computer system 102. The kernel 130 is the core of an operating system, and is what controls the processes on a computer system 102, what handles the memory being swapped in and out, and what drives the hardware of the computer system 102 to launch applications. For the workload 115 at issue, the kernel 130 of the computer system 102 calls out to the SMT scheduler 135 in order to determine whether or not to enable SMT. In order to determine whether to enable SMT, the SMT scheduler 135 has one or more autonomic hooks that tie into a genetic library 140. From collected data processed in the genetic library 140, autonomic hooks call back to the SMT scheduler 135 to provide it with data informing the SMT scheduler 135 whether or not to enable SMT for the workload 115.

Through logic in software and/or hardware, a configuration module 145 associated with the genetic library 140 allows a user of the computer system 102 having the cpu 105 to configure the learning module 150 and genetic data module 155 associated with the genetic library 140. Below, configuring of these two modules 150, 155 is discussed in tandem with the detailed discussion of these two modules 150, 155.

Further enabling logic in the learning module 150 includes and processes a genetic algorithm. Upon initial set-up of the system's 100 learning module 150, or even set-up for a particular workload 115, the learning module 150 may not have any collected data to analyze in order for the genetic library 140 to ultimately determine whether or not to enable SMT for the workload 115. As a result, using the configuration module 145, a user of the computer system 102 having the workload 115 supplies the learning module 150 with data representing an initial population for processing by the genetic algorithm. Further, through the configuring, the user also chooses what metric, e.g., increased throughput, minimized latency, minimized power consumption, etc., for optimized processing of the workload 115.

The initial population is an assignment of all the cpus in the system 100 with on or off values at different times for ultimate and optimal SMT processing of the workload 150. At this point of configuring, what is occurring is a set-up for the creation of "children," which are "time-slices" for processing the workload 150 on the various "genes" of the computer system 102, wherein a "gene" is a property, such as whether a particular cpu has SMT enabled or disabled. Stated another way and by example, configuring the set-up is the user saying children need to be created. As a result, the genetic algorithm calls the SMT scheduler 135 to request a set of genes. The SMT scheduler 135 may randomly create the genes with various on and off settings and time-slices, and once finished, the SMT scheduler 135 calls back through one or more autonomic hook to the genetic library 140 to report the initial population set-up is complete.

After this generation of the initial population, the population time-slices, i.e., children having particular settings, such as on or off for the cpus and threads, are run by the learning module's 150 genetic algorithm. By starting with the very first child, the genetic algorithm tells the SMT scheduler 135 to run this child with a particular set of genes, and then run the second child with a particular set of genes, and so forth until all the children generated in the initial set-up are run.

After running each of the children, the genetic algorithm evaluates the population member's performance, also known as fitness, and ranks the children's performance through any chosen metric, such as transactions per second or others previously mentioned. The half of the population ranking the highest in performance (i.e., "upper half") are retained, whereas the lower half is discarded as poor performers.

Using the configuration module 145, a user may also configure the genetic data module 155 to configure how the genetic data module 155 is to retain and/or delete the top half and lower half performers. For instance, the user may configure the genetic data module 155 by adjusting one or more of its associated switches, for example, to simply delete the lower half performers, to store, i.e., MALLOC, the upper half and/or lower half of performers, or even to overwrite the upper half of performers upon the genetic algorithm's iterative calculation of performance and ranking in optional, continuous or predetermined threshold analysis of children by the genetic algorithm. As for MALLOC, this is a standard library routine for storage allocation used in programming languages such as C. MALLOC takes the number of bytes required and returns a pointer to a block of that size. Storage is allocated from a heap, which lies after the end of the program and data areas. Memory allocated with MALLOC must be freed explicitly after usage using the "free" routine before the memory can be re-used.

In line with the continuous or predetermined threshold analysis of children, the genetic algorithm may continue analysis of the upper half of performers in striving towards optimized processing of the workload 115 by SMT on the computer system 102. In a second generation analysis using the genetic algorithm, new children need to be created. The new children are created by combining half of the genes of one parent with half of the genes of another parent. Importantly, the parents of any generation are half of the child population from the previous generation; preferably, the parents are the upper half of performers from the pervious children's population. By creating successive generation populations in this manner, the size of the successive generation population is a constant and always the same as the initial population. However, the second and successive generation population performance is markedly better than the initial population because all the parents come from the upper half of performers from the first generation. This process can be repeated continuously or until a threshold performance level is achieved. Continuous repetition of the genetic algorithm, however, is preferred because performance of the entire population increases in successive generations, and, thus, optimal processing of the workload 115 is increased. Further, the overhead cost of executing the genetic algorithm continuously is likely minimal, and the system 100 autonomically adapts to changes in workloads, such as the onset of additional workloads onto the system 100 besides workload 115. As one alternative to setting the configuration module 145 to continuously run, the user may set the genetic algorithm to run, for example, for a fixed period, such as a fixed number of generations, a fixed period of time, or a fixed performance threshold.

In the genetic algorithm's creation of second and later generation populations, mutations are optionally introduced into the populations in order to prevent a homogenous gene pool from arising after multiple iterations. By using the configuration module 145, a user would introduce one or more mutations, such as switching a gene's "on" position to "off" before running the genetic algorithm to create the second or a later generation's population. That is, for example, a mutation is analogous to switching a cpu or thread from on to off or vice versa. Ideally, mutations are introduced for every generation to prevent homogeneity, a consequence that weighs against finding optimized processing of the workload 115 through optional SMT enablement.

Ultimately, the genetic data acquired by calculating and ranking performance over one or more successive generations is stored, such as searchable file or a table, in the genetic data module 155 for the last generation. For the particular workload 115 at issue, the control module 160 accesses this "best" performing child in the genetic data module 155, which may already be stored based on past running(s) of the genetic algorithm for a similar workload, and communicates the same to the SMT scheduler 135 through the one or more automatic hooks associated with the SMT scheduler 135. Now, when the kernel 130 processes the workload 115 with a call to the SMT scheduler 135, the SMT scheduler 135 uses this best child's genetic data in order to determine whether or not to enable SMT and on which cpus for optimized processing of the workload 115. In FIG. 1, for instance, the SMT scheduler 135, based on this best child's genetic data, would necessarily use the one cpu 105 of the computer system 102, and may or may not enable SMT for processing the workload 115 on the two threads 120, 125.

FIG. 2 is presented as a genetic algorithm outline 200 to clearly delineate its general steps used, for example, by computer system 102 in FIG. 1, or, just as equally, more complicated systems having multiple cpus, to autonomically tune SMT.

Figure 3:
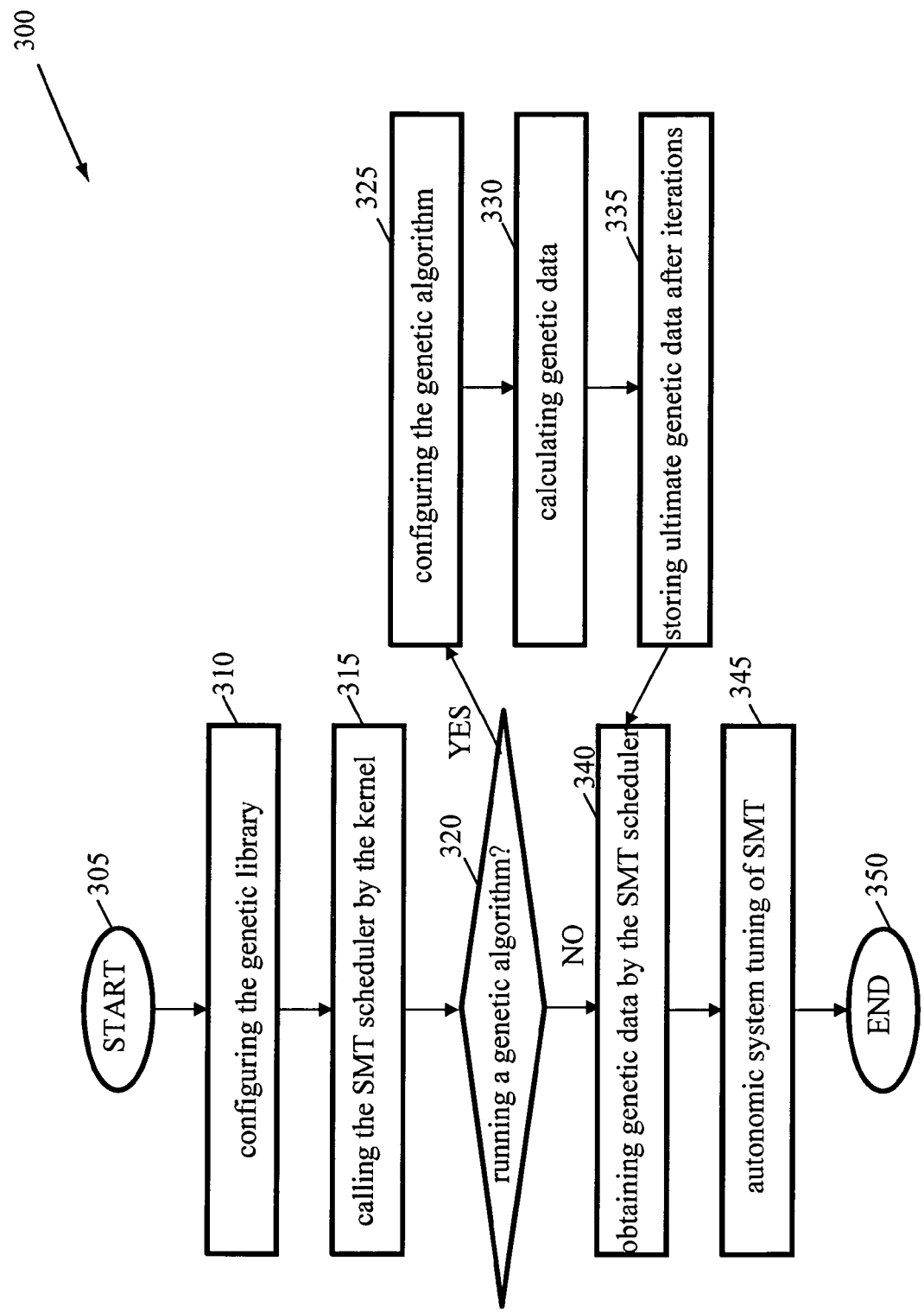
FIG. 3 depicts an example embodiment of a flowchart for autonomic system tuning of SMT for a workload in accordance with the disclosed invention.

Now, moving to FIG. 3, a flowchart 300 for autonomic system tuning of SMT is depicted for a system such as system 100 in FIG. 1. Flowchart 300 begins at 305 by a user configuring 310 the genetic library containing a genetic algorithm and, if not initially, then genetic data eventually stored in the genetic library. Through enabling logic in software and/or hardware, the configuring 310 includes the user setting the number of iterative generations to continuous or a fixed amount for the running of a genetic algorithm in the genetic library. By fixed amount, the configuring 310 may occur by the user setting switches on an interface for running the genetic algorithm a fixed number of generations, a fixed amount of time, or until a fixed performance threshold is obtained for a workload being processed by the flowchart 300. Alternatively, setting the running of a genetic algorithm to continuous results in the genetic algorithm always running, a result that ensure optimal throughput of the workload is achieved. In addition, the configuring 310 further includes the user setting the management of genetic data, i.e., performance and ranking, calculated by running the genetic algorithm. For instance, the configuring 310 may include storing all of the genetic data in MALLOC, overwriting the upper half of genetic data calculated for each successive generation, discarding the lower half of genetic data calculated for each successive generation, and so forth.

After configuring 310 the genetic library, the flowchart 300 continues by the kernel calling the SMT scheduler in order to determine how to optimally process the workload by enabling, or not enabling, SMT on the one or more processor threads found on the one or more cpus. In order to determine whether to enable SMT, the SMT scheduler has at least one autonomic hook into a genetic library for querying whether to run a genetic algorithm, which is depicted in the flowchart 300 by decision block 320. In order to determine whether to run 320 the genetic algorithm, the autonomic hook looks to see if genetic data already exists in the genetic library for the workload currently needing processing. If so, the genetic algorithm need not be run, and, instead, the flowchart 300 continues by the SMT scheduler simply obtaining 340, through an autonomic hook, the already stored genetic data in the genetic library, and then autonomically tuning 345 SMT before the flowchart 300 ends 350. Otherwise, decision block 320 is yes, and the genetic algorithm is run.

Before running the genetic algorithm, a user configures 325 the genetic algorithm by selecting which genetic data metric(s) to optimize for a workload. For example, if the user selects the throughput metric, then the genetic algorithm calculates genetic data in order to optimize throughput of the workload. Similarly, the genetic algorithm would calculate genetic data in order to minimize latency and power consumption by the computer system if either of these metrics were chosen instead. In addition, the user configures 325 the genetic algorithm with an initial population by assigning the various cpus on the computer system with an on or off values and with time-slices for running the threads on these cpus is the creation of "children." Furthermore, the configuring 325 includes the user optionally being able to introduce mutations at a set rate and amount into the running of the genetic algorithm in successive generations. Upon each run of the genetic algorithm, genetic data is calculated 330 for the chosen metric, and, ultimately, at least the optimal genetic data for the workload at issue is stored in the genetic library. This optimal genetic data is then obtained 340 by the SMT scheduler through an autonomic hook for optimal and autonomic system tuning 345 of SMT to optimally process the workload at issue, whereupon the flowchart 300 then ends 350. Being autonomic, the flowchart 300 beneficially removes reliance on a system administrator to adjust the kernel for each and every different workload to be processed.

Another embodiment of the invention is implemented as a program product for use with a computer system such as, for example, the system 100 shown in FIG. 1. The program(s) of the program product defines functions of the embodiments (including the methods described herein) and can be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); and (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

While the foregoing is directed to example embodiments of the disclosed invention, other and further embodiments of the invention may be devised without departing from the basic scope thereof, and the scope thereof is determined by the claims that follow.

What is claimed is:

1. A method for autonomic tuning of at least one simultaneous multi-threading (SMT) setting for an optimized processing of a workload on a computer system, the method comprising:

calling, by a kernel, an SMT scheduler having at least one hook into a genetic library, wherein the genetic library retains genetic data comprising performance and ranking data for the workload;

configuring a genetic algorithm with an initial value of the at least one SMT setting for at least one cpu of the computer system, and with a metric selected in order to achieve the optimized processing for the workload;

running the genetic algorithm to calculate the genetic data;

introducing at least one mutation into the running of the genetic algorithm, wherein the at least one mutation is a different setting of the at least one SMT setting for at least one cpu of the computer system;

obtaining, by the SMT scheduler through the at least one hook, the genetic data from the genetic library for the optimized processing of the workload; and tuning, by the SMT scheduler and based on the obtaining, the at least one SMT setting for the at least one center processing unit (cpu) of the computer system, wherein the tuning comprises tuning one or more processor threads associated with the at least one cpu of the computer system.

2. The method of claim 1, wherein the running comprises continuously running the genetic algorithm.

3. The method of claim 1, wherein the running comprises running the genetic algorithm for a fixed period.

4. The method of claim 1, further comprising storing, by the genetic algorithm, the genetic data in the genetic library.

5. A system for autonomic tuning of at least one simultaneous multi-threading (SMT) setting for an optimized processing of a workload on a computer system, the system comprising:

a kernel in communication with an SMT scheduler having at least one hook into a genetic library, wherein the genetic library retains genetic data comprising performance and ranking data for the workload;

a learning module, associated with the genetic library, for running a genetic algorithm and for calculating the genetic data;

a configuration module for configuring the genetic algorithm with an initial value of the at least one SMT setting for at least one cpu of the computer system, and with a metric selected in order to achieve the optimized processing for the workload, wherein the configuration module further comprises introduction of at least one mutation;

a genetic data module of the genetic library, wherein the genetic data module has genetic data necessary for the optimized processing of the workload; and a control module of the genetic library for providing the genetic data to the SMT scheduler through the at least one hook, whereby the SMT scheduler tunes the at least one SMT setting for at least one central processing until (cpu) of the computer system in accordance with genetic data provided, wherein the SMT scheduler tunes by tuning one or more processor threads associated with the at least one cpu of the computer system.

6. The system of claim 5, wherein the genetic data comprises performance and ranking latency data of the at least one SMT setting for the at least one cpu of the computer system.

7. The system of claim 5, wherein the genetic data comprises performance and ranking throughput data of the at least one SMT setting for the at least one cpu of the computer system.

8. The system of claim 5, wherein the genetic data comprises performance and ranking power consumption data of the at least one SMT setting for the at least one cpu of the computer system.

9. The system of claim 5, wherein the genetic data module further comprises one or more switches for managing the genetic data.

10. A machine-accessible storage medium containing instructions, which when executed by a machine, cause the machine to perform operations for autonomic tuning of at least one simultaneous multi-threading SMT setting for optimized processing of a workload on a computer system, comprising:

calling, by a kernel, an SMT scheduler having at least one hook into a genetic library, wherein the genetic library retains genetic data comprising performance and ranking data for the workload;

configuring a genetic algorithm with an initial value of the at least one SMT setting for at least one cpu of the computer system, and with a metric selected in order to achieve the optimized processing for the workload;

running the genetic algorithm to calculate the genetic data;

introducing at least one mutation into the running of the genetic algorithm, wherein the at least one mutation is a different setting of the at least one SMT setting for at least one cpu of the computer system;

obtaining, by the SMT scheduler through the at least one hook, the genetic data from the genetic library for the optimized processing of the workload; and tuning, by the SMT scheduler and based on the obtaining, the at least one SMT setting for the at least one center processing unit (cpu) of the computer system, wherein the tuning comprises tuning one or more processor threads associated with the at least one cpu of the computer system.

11. The machine-accessible storage medium of claim 10, wherein the instructions for running comprises instructions for running the genetic algorithm for a fixed period.

12. The machine-accessible storage medium of claim 10, wherein the instructions further comprise instructions to perform operations for storing, by the genetic algorithm, the genetic data in the genetic library.

* * * * *